US012799240B2

(12) United States Patent
Takenaka et al.

(10) Patent No.: US 12,799,240 B2
(45) Date of Patent: Nov. 17, 2026

(54) MODIFIED POLYVINYL ACETAL RESIN, STORAGE BATTERY ELECTRODE COMPOSITION, PIGMENT COMPOSITION

(71) Applicant: SEKISUI CHEMICAL CO., LTD., Osaka (JP)

(72) Inventors: Keisuke Takenaka, Shiga (JP); Yutaro Asaba, Shiga (JP); Jun Sasaki, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 785 days.

(21) Appl. No.: 18/014,535

(22) PCT Filed: Jul. 13, 2021

(86) PCT No.: PCT/JP2021/026318
§ 371 (c)(1),
(2) Date: Jan. 5, 2023

(87) PCT Pub. No.: WO2022/014596
PCT Pub. Date: Jan. 20, 2022

(65) Prior Publication Data

US 2023/0250203 A1 Aug. 10, 2023

(30) Foreign Application Priority Data

Jul. 14, 2020 (JP) ................................. 2020-120668
Mar. 22, 2021 (JP) ................................. 2021-047650

(51) Int. Cl.

| | |
|---|---|
| ***C08F 16/38*** | (2006.01) |
| ***C08F 8/24*** | (2006.01) |
| ***C09D 7/20*** | (2018.01) |
| ***C09D 17/00*** | (2006.01) |
| ***H01M 4/62*** | (2006.01) |

(52) U.S. Cl.
CPC ................ *C08F 16/38* (2013.01); *C08F 8/24* (2013.01); *C09D 7/20* (2018.01); *C09D 17/003* (2013.01); *H01M 4/62* (2013.01); *H01M 4/623* (2013.01)

(58) Field of Classification Search
CPC .............. C08F 16/38; C08F 8/24; C09D 7/20; C09D 17/003; H01M 4/62; H01M 4/623
See application file for complete search history.

(56) References Cited

U.S. PATENT DOCUMENTS

| | | | | |
|---|---|---|---|---|
| 6,506,835 | B1 * | 1/2003 | Hofmann | B32B 17/10761 525/401 |
| 2019/0074517 | A1 | 3/2019 | Oota | |
| 2020/0136143 | A1 * | 4/2020 | Masuda | H01M 4/1393 |

FOREIGN PATENT DOCUMENTS

| | | | | |
|---|---|---|---|---|
| EP | 2 524 932 | | 11/2015 | |
| EP | 3 439 088 | | 2/2019 | |
| JP | 58-11046 | | 1/1983 | |
| JP | S5811046 | A * | 1/1983 | |
| JP | 58-134087 | | 8/1983 | |
| JP | 3-162989 | | 7/1991 | |
| JP | H03162989 | A * | 7/1991 | |
| JP | 5-45899 | | 2/1993 | |
| JP | H0545899 | A * | 2/1993 | |
| JP | 2001-172543 | | 6/2001 | |
| JP | 2002-244242 | | 8/2002 | |
| JP | 5708872 | | 4/2015 | |
| JP | 2015-141883 | | 8/2015 | |
| JP | 2016-79345 | | 5/2016 | |
| TW | 201739096 | | 11/2017 | |
| WO | WO-2020262946 | A1 * | 12/2020 | C09J 7/10 |

OTHER PUBLICATIONS

JPH0545899A Translation (Year: 1993).*
JPS5811046A Translation (Year: 1983).*
H03162989 Translation (Year: 1991).*
International Search Report issued Sep. 7, 2021 in International (PCT) Application No. PCT/JP2021/026318.
Etienne Schacht et al., "Synthesis and Hydrolysis of Poly(vinyl acetals) Derived from Poly(vinyl alcohol) and 2,6-Dichlorobenzaldehyde[1]", Macromolecules, vol. 16, pp. 291-296, 1983.

* cited by examiner

*Primary Examiner* — Amanda C. Walke
(74) *Attorney, Agent, or Firm* — Wenderoth, Lind & Ponack, L.L.P.

(57) ABSTRACT

The present invention aims to provide a composition for a storage battery electrode and a pigment composition each containing a modified polyvinyl acetal resin that has excellent dispersing properties, adhesion, and stability over time and that is capable of preventing degradation caused by an electrolyte solution when used for an electrode of a storage battery, enabling the production of a high-power storage battery. Provided is a modified polyvinyl acetal resin including a chlorine atom-containing structural unit.

15 Claims, No Drawings

MODIFIED POLYVINYL ACETAL RESIN, STORAGE BATTERY ELECTRODE COMPOSITION, PIGMENT COMPOSITION

TECHNICAL FIELD

The present invention relates to a modified polyvinyl acetal resin having excellent dispersing properties, adhesion, and stability over time and capable of preventing degradation caused by an electrolyte solution when used for an electrode of a storage battery, enabling the production of a high-power storage battery. The present invention also relates to a composition for a storage battery electrode and a pigment composition each containing the modified polyvinyl acetal resin.

BACKGROUND ART

Polyvinyl acetal resins are synthesized from polyvinyl alcohol as a raw material. They have an acetyl group, a hydroxy group, and an acetal group in the side chains. These side chains allow polyvinyl acetal resins to exhibit properties such as excellent toughness or excellent adhesion. The resin physical properties can be changed by changing the proportions of the side chain groups. Owing to such characteristics, polyvinyl acetal resins are used in many applications such as electrodes of storage batteries, pigment compositions, and ceramic green sheets.

With the recent spread of mobile electronic devices such as mobile video cameras and mobile PCs, the demand for storage batteries (secondary batteries) as portable power sources is rapidly increasing. Moreover, there is a very high demand for smaller, lighter secondary batteries with higher energy density.

In response to this, lithium secondary batteries including a negative electrode made of lithium or a lithium alloy have been actively studied and developed. Lithium secondary batteries have excellent properties such as high energy density, less self-discharge, and light weight.

At the present, fluororesins typified by polyvinylidene fluoride (PVDF) are most common as binders for electrodes of lithium secondary batteries.

However, while a fluororesin used as a binder can form a flexible thin film, it may provide poor binding between the current collector and the active material. This may cause the active material to partially or completely detach or fall off from the current collector during the battery production process. Moreover, with the insertion and release of lithium ions repeated in the active material upon charge and discharge of the battery, the active material may detach or fall off from the current collector.

To solve the above issues, use of binders other than PVDF has been attempted. For example, Patent Literature 1 discloses a binder for a non-aqueous secondary battery, wherein the binder contains a copolymer of an acidic functional group-containing monomer and an amide group-containing monomer.

It is disclosed that such a binder has excellent resistance against electrolyte solutions and good adhesion to electrodes and ensures safety in production.

Meanwhile, inks and coating materials are obtained by adding a pigment and other additives to a binder resin and dispersing them in a solvent. Common binder resins are polyvinyl acetal resins such as polyvinyl butyral resins.

Patent Literature 2 discloses an ink for oil-based ballpoint pens that contains a resin having a solubility in ethanol at 25

°C of higher than 7% by weight. It is disclosed that the resin used may be a polyvinyl acetal resin.

CITATION LIST

Patent Literature

Patent Literature 1: JP 5708872 B
Patent Literature 2: JP 2001-172543 A

SUMMARY OF INVENTION

Technical Problem

However, use of the binder disclosed in Patent Literature 1 may result in low dispersibility of the active material, causing uneven application during application or insufficient capacity of the resulting battery.

Use of such a resin may also result in high electrode resistance.

Additionally, such a resin may dissolve in the electrolyte solution, causing a reduction in battery durability.

The ink disclosed in Patent Literature 2 is insufficient in pigment dispersibility or pigment dispersion stability over time.

The modified polyvinyl acetal resin according to the present invention has excellent dispersing properties, adhesion, and stability over time. In addition, the modified polyvinyl acetal resin can reduce electrode resistance and prevent degradation caused by an electrolyte solution when used for an electrode of a storage battery, enabling the production of a high-power storage battery.

Accordingly, the present invention aims to provide a modified polyvinyl acetal resin excellent in the above properties, as well as a composition for a storage battery electrode and a pigment composition each containing the modified polyvinyl acetal resin.

Solution to Problem

The present invention relates to a modified polyvinyl acetal resin including a chlorine atom-containing structural unit.

The present invention is described in detail below. Note that herein the "total acetal group content" in Japanese Patent Application No. 2020-120668 and Japanese Patent Application No. 2021-047650 is described as a "degree of acetalization", and the "degree of acetalization" in these applications is described as a "degree of non-chlorination acetalization."

As a result of intensive studies, the present inventors have found out that a modified polyvinyl acetal resin including a chlorine atom-containing structural unit has excellent dispersing properties, adhesion, and stability over time. The inventors have also found out that such a resin can reduce electrode resistance and prevent degradation caused by an electrolyte solution when used for an electrode of a storage battery, enabling the production of a high-power storage battery. The inventors thus have completed the present invention.

The modified polyvinyl acetal resin of the present invention includes a chlorine atom-containing structural unit. With the chlorine atom-containing structural unit included, the modified polyvinyl acetal resin can have excellent adhesion and dispersing properties, and the resulting composition can have excellent stability over time. In addition, the modified polyvinyl acetal resin can reduce electrode resistance and prevent degradation caused by an electrolyte solution when used for an electrode of a storage battery, enabling the production of a high-power storage battery. Here, the stability over time means that changes in physical properties such as viscosity (particularly, increase in viscosity) over time are small.

The chlorine atom-containing structural unit preferably contains one to three chlorine atoms.

In the present invention, the chlorine atom-containing structural unit may be any structure containing a chlorine atom. The chlorine atom-containing structural unit is preferably a structure having a chlorine atom bonded via an acetal bond or a structure having a chlorine atom or a chlorine atom-containing group in a side chain, for example. The structure having a chlorine atom bonded via an acetal bond encompasses a structure having a chlorine atom bonded via an acetal bond and further via a linking group other than the acetal bond.

When the chlorine atom-containing structural unit is a structure having a chlorine atom bonded via an acetal bond (hereinafter, such a structural unit may also be referred to as a chlorine-modified acetal-bond unit), the chlorine atom-containing structural unit is preferably a structural unit represented by the formula (3).

[Chem. 1]

(3)

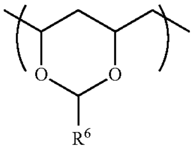

In the formula (3), $R^6$ represents a chlorine atom-containing hydrocarbon group.

The chlorine atom-containing hydrocarbon group for $R^6$ may be a chlorine atom-containing aliphatic group or a chlorine atom-containing aromatic group. It is preferably a chlorine atom-containing aliphatic group.

$R^6$ preferably has a ratio of the number of carbon atoms to the number of chlorine atoms [number of carbon atoms/number of chlorine atoms] of 0.1 to 5.

The chlorine-modified acetal-bond unit is also preferably a structural unit represented by the formula (1).

The presence of a structural unit represented by the formula (1) allows the main chain of the modified polyvinyl acetal resin to maintain an appropriate distance from chlorine atoms. As a result, the modified polyvinyl acetal resin can have excellent adhesion and dispersing properties, and the resulting composition can have even better stability over time. In addition, the modified polyvinyl acetal resin can reduce electrode resistance when used for an electrode of a storage battery.

[Chem. 2]

(1)

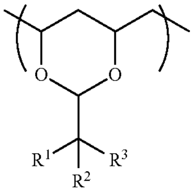

In the formula (1), $R^1$ represents a chlorine atom or a chloroalkyl group; and $R^2$ and $R^3$ each independently represent a hydrogen atom or a chlorine atom.

$R^2$ and $R^3$ each may be a chloroalkyl group.

Examples of the chloroalkyl group include chloromethyl ($—CH_2Cl$), chloroethyl ($—CH_2CH_2Cl$), dichloroethyl, chloropropyl, and trichloromethyl groups. In the formula (1), $R^1$ is preferably a chlorine atom, $—CH_2Cl$, or $—CH_2CH_2Cl$.

In the present invention, in a preferred combination, $R^1$ is a chlorine atom and $R^2$ and $R^3$ are each a hydrogen atom.

$R^6$ is preferably a chlorine atom-containing aromatic group. The presence of the chlorine atom-containing aromatic group can result in better adhesion to and better dispersing properties for an aromatic compound and a compound having an aromatic functional group.

Examples of the chlorine atom-containing aromatic group include chlorophenyl groups and chloroalkyl phenyl groups. Examples of the chlorophenyl groups include 2-chlorophenyl, 3-chlorophenyl, 4-chlorophenyl, 2,4-dichlorophenyl, and 3,4-dichlorophenyl groups.

Examples of the chloroalkyl phenyl groups include 2-chloromethyl phenyl, 3-chloromethyl phenyl, and 4-chloromethyl phenyl groups.

The chlorophenyl groups and the chloroalkyl phenyl groups may have another substituent in addition to the chloro group(s).

When the chlorine atom-containing structural unit is a structure having a chlorine atom or a chlorine atom-containing group in a side chain (hereinafter, such a structural unit may also be referred to as a chlorine-modified side-chain-bond unit), the chlorine atom-containing structural unit is preferably a structure (structural unit) represented by the following formula (2).

The presence of the structural unit represented by the formula (2) allows the modified polyvinyl acetal resin to have excellent adhesion and dispersing properties and allows the resulting composition to have even better stability over time. It also allows the modified polyvinyl acetal resin to reduce electrode resistance when used for an electrode of a storage battery.

[Chem. 3]

(2)

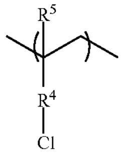

In the formula (2), $R^4$ represents a single bond or an alkylene group, and $R^5$ represents a hydrogen atom, a chlorine atom, or a chloroalkyl group.

$R^4$ may be a chloroalkylene group.

The alkylene group represented by $R^4$ preferably has a carbon number of 1 to 20. For example, the alkylene group is preferably a linear alkylene group, a branched alkylene group, or a cyclic alkylene group.

Examples of the linear alkylene group include methylene, ethylene, trimethylene, tetramethylene, pentamethylene, hexamethylene, octamethylene, and decamethylene groups.

Examples of the branched alkylene group include methylmethylene, methylethylene, 1-methylpentylene, and 1,4-dimethylbutylene groups.

Examples of the cyclic alkylene group include cyclopropylene, cyclobutylene, and cyclohexylene groups. Preferred among these are linear alkyl groups such as methylene, ethylene, n-propylene, and n-butylene groups. More preferred are methylene and ethylene groups.

The chloroalkyl group for $R^5$ may be the same as that for $R^1$.

In the present invention, in a preferred combination, $R^4$ is a single bond and $R^5$ is a hydrogen atom.

The lower limit of the amount of the chlorine atom-containing structural unit (chlorine-modified unit content) in the modified polyvinyl acetal resin of the present invention is preferably 0.1 mol %. The chlorine-modified unit content of 0.1 mol % or more can improve the adhesion and the dispersing properties as well as the stability over time of the resulting composition. The lower limit of the chlorine-modified unit content is more preferably 1.0 mol %, still more preferably 4.0 mol %. The upper limit of the chlorine-modified unit content is not limited and is preferably 35 mol %, more preferably 30 mol % from the viewpoint of handleability during production.

Here, when the modified polyvinyl acetal resin of the present invention contains both the chlorine-modified acetal-bond unit and the chlorine-modified side-chain-bond unit, the chlorine-modified unit content means the sum of them.

When the modified polyvinyl acetal resin of the present invention includes a structure having a chlorine atom bonded via an acetal bond (chlorine-modified acetal-bond unit), the lower limit of the amount of the chlorine-modified acetal-bond unit is more preferably 0.1 mol %. The chlorine-modified acetal-bond unit in an amount of 0.1 mol % or more can improve the adhesion and the dispersing properties as well as the stability over time of the resulting composition. The lower limit of the amount of the chlorine-modified acetal-bond unit is more preferably 1.0 mol %, still more preferably 4.0 mol %. The upper limit of the amount of the chlorine-modified acetal-bond unit is not limited and may be 30 mol % from the viewpoint of handleability during production.

When the modified polyvinyl acetal resin of the present invention includes a structure having a chlorine atom or a chlorine atom-containing group in a side chain (chlorine-modified side-chain-bond unit), the lower limit of the amount of the chlorine-modified side-chain-bond unit is more preferably 0.1 mol %, and the upper limit thereof is more preferably 15 mol %. The lower limit is still more preferably 0.5 mol %, and the upper limit is still more preferably 10 mol %. The chlorine-modified side-chain-bond unit in an amount within the above range can improve the adhesion and the dispersing properties as well as the stability over time of the resulting composition.

When the modified polyvinyl acetal resin of the present invention includes both the chlorine-modified acetal-bond unit and the chlorine-modified side-chain-bond unit, the ratio between these units (chlorine-modified acetal-bond unit/chlorine-modified side-chain-bond unit) is preferably 0.5 or greater and 3 or less, more preferably 1 or greater and 2 or less.

The modified polyvinyl acetal resin of the present invention includes a hydroxy group-containing structural unit, an acetyl group-containing structural unit, and an acetal group-containing structural unit.

The modified polyvinyl acetal resin of the present invention includes the hydroxy group-containing structural unit.

The lower limit of the amount of the hydroxy group-containing structural unit (hydroxy group content) in the modified polyvinyl acetal resin of the present invention is preferably 20 mol %, and the upper limit thereof is preferably 70 mol %. The hydroxy group content of 20 mol % or more can improve the solubility in an organic solvent, allowing the resin to be suitably used in the form of a composition. The hydroxy group content of 70 mol % or less allows the resin to maintain its flexibility.

The lower limit of the hydroxy group content is more preferably 25 mol %, and the upper limit thereof is more preferably 65 mol %.

The modified polyvinyl acetal resin of the present invention includes the acetyl group-containing structural unit.

The lower limit of the amount of the acetyl group-containing structural unit (acetyl group content) in the modified polyvinyl acetal resin of the present invention is preferably 0.1 mol %, and the upper limit thereof is preferably 20 mol %. The acetyl group content of 0.1 mol % or more allows the resin to maintain its flexibility. The acetyl group content of 20 mol % or less allows the modified polyvinyl acetal resin to have improved resistance against an electrolyte solution when used for an electrode of a storage battery, so that degradation of the battery caused by elution of the resin into the electrolyte solution can be prevented. The lower limit of the acetyl group content is more preferably 0.3 mol %, and the upper limit thereof is more preferably 10 mol %.

The polyvinyl acetal resin includes the acetal group-containing structural unit.

The polyvinyl acetal resin preferably includes both a structural unit containing a non-chlorinated acetal group and a structural unit containing a chlorinated acetal group as the acetal group-containing structural units.

The amount of the structural unit containing a non-chlorinated acetal group in the polyvinyl acetal resin (degree of non-chlorination acetalization) is preferably 20 mol % or more and 75 mol % or less. The degree of non-chlorination acetalization of 20 mol % or more allows the resin to have improved solubility in an organic solvent and thus to be suitably used in the form of a composition. The degree of non-chlorination acetalization of 75 mol % or less allows the resin to maintain the adhesion and the dispersing properties. The degree of non-chlorination acetalization is more preferably 25 mol % or more and 70 mol % or less.

The degree of non-chlorination acetalization herein means the percentage of the number of hydroxy groups acetalized with an aldehyde that contains no chlorine atom in the portion excluding the aldehyde group (e.g., butyraldehyde, acetaldehyde) in the number of hydroxy groups in a polyvinyl alcohol. The amount of the "structure having a chlorine atom bonded via an acetal bond" is thus not included in the degree of non-chlorination acetalization.

The degree of non-chlorination acetalization (mol %) herein is calculated by counting acetalized two hydroxy groups because an acetal group of a polyvinyl acetal resin is formed by acetalization of two hydroxy groups.

The non-chlorinated acetal group is preferably an acetoacetal group acetalized with acetaldehyde or a butyl acetal group acetalized with butyraldehyde.

The amount of the acetoacetal group acetalized with acetaldehyde (acetoacetal group content) in the modified polyvinyl acetal resin of the present invention is preferably 10 mol % or more and 50 mol % or less.

The amount of the butyl acetal group acetalized with butyraldehyde (butyral group content) in the modified polyvinyl acetal resin of the present invention is preferably 3 mol % or more and 75 mol % or less. When the amounts are within the ranges, the modified polyvinyl acetal resin can maintain water resistance and can have excellent viscosity characteristics.

When the modified polyvinyl acetal resin of the present invention includes both the structural unit containing a non-chlorinated acetal group and the chlorine-modified acetal-bond unit, the degree of acetalization, which is the sum of the degree of non-chlorination acetalization and the amount of the chlorine-modified acetal-bond unit [degree of non-chlorination acetalization+amount of chlorine-modified acetal-bond unit], is preferably 25 mol % or more. The sum is preferably 80 mol % or less. The sum within the range allows the modified polyvinyl acetal resin to maintain solubility in an organic solvent while having excellent adhesion and dispersing properties, and allows the resulting composition to have high stability over time. The degree of acetalization is more preferably 30 mol % or more and 75 mol % or less.

The ratio of the structural unit containing a non-chlorinated acetal group to the amount of the chlorine-modified acetal-bond unit [degree of non-chlorination acetalization/amount of chlorine-modified acetal-bond unit] is preferably 15 or less. The ratio is more preferably 10 or less. The lower limit is not limited and is preferably 1 or greater.

The ratio of the degree of non-chlorination acetalization to the degree of acetalization [degree of non-chlorination acetalization/degree of acetalization] is preferably 0.4 or greater and 0.95 or less. The ratio within the range allows the modified polyvinyl acetal resin to maintain the solubility in an organic solvent while having excellent adhesion and dispersing properties, and allows the resulting composition to have high stability over time.

The ratio of the amount of the chlorine-modified acetal-bond unit to the degree of acetalization [amount of chlorine-modified acetal-bond unit/degree of acetalization] is preferably 0.05 or greater and 0.6 or less. The ratio within the range allows the modified polyvinyl acetal resin to maintain the solubility in an organic solvent while having excellent adhesion and dispersing properties, and allows the resulting composition to have high stability over time.

The ratio of the degree of non-chlorination acetalization to the hydroxy group content [degree of non-chlorination acetalization/hydroxy group content] is preferably 0.3 or greater and 3.5 or less, more preferably 0.5 or greater and 3.0 or less. The ratio within the range allows the modified polyvinyl acetal resin to maintain the solubility in an organic solvent while having excellent adhesion and dispersing properties, and allows the resulting composition to have high stability over time.

In the modified polyvinyl acetal resin of the present invention, the sum of the degree of non-chlorination acetalization and the chlorine-modified unit content [degree of non-chlorination acetalization+chlorine-modified unit content] is preferably 25 mol % or more and 80 mol % or less. The sum within the range results in improved adhesion and dispersing properties as well as improved stability over time of the resulting composition. The sum (degree of non-chlorination acetalization+chlorine-modified unit content) is more preferably 30 mol % or more and 75 mol % or less.

In the modified polyvinyl acetal resin of the present invention, the ratio of the degree of non-chlorination acetalization to the chlorine-modified unit content [degree of non-chlorination acetalization/chlorine-modified unit content] is preferably 1 or greater and 50 or less, more preferably 1.5 or greater and 40 or less, still more preferably 2 or greater and 35 or less, further preferably or greater and 30 or less. The ratio within the range results in improved adhesion and dispersing properties as well as improved stability over time of the resulting composition.

The ratio (degree of non-chlorination acetalization/chlorine-modified unit content) is particularly preferably 8 or greater and 20 or less.

The lower limit of the degree of polymerization of the modified polyvinyl acetal resin of the present invention is preferably 200, and the upper limit thereof is preferably 4,000. The degree of polymerization of 200 or greater allows the modified polyvinyl acetal resin to be easily industrially produced. The degree of polymerization of 4,000 or less results in appropriate solution viscosity, which allows the modified polyvinyl acetal resin to be industrially produced. The lower limit of the degree of polymerization is more preferably 500, and the upper limit thereof is more preferably 2,500.

The modified polyvinyl acetal resin of the present invention preferably has a chlorine atom content A measured by combustion ion chromatography of 0.1% by weight or more and 15% by weight or less, more preferably 10% by weight or less. The chlorine atom content A within the range makes it possible to suitably obtain the effects of the present invention. The lower limit of the chlorine atom content A is more preferably 0.5% by weight, and the upper limit thereof is still more preferably 9% by weight. The chlorine atom content A can be measured in conformity with JIS K 0127(2013) by combustion ion chromatography. This measurement method provides the measurement results of the chlorine atom content of polyvinyl acetal resin powder regardless of the presence or absence of a bond between the resin and a chlorine atom. The chlorine atom content A thus represents the sum of the amount of chlorine atoms bonded to the resin and the amount of chlorine atoms not bonded to the resin.

The modified polyvinyl acetal resin of the present invention preferably has a chlorine atom content B measured by NMR of 0.1% by weight or more and 10% by weight or less.

The chlorine atom content B means a chlorine atom content calculated from the chlorine-modified unit content measured by NMR.

The chlorine atom content B thus represents the amount of chlorine atoms bonded to the resin.

The value (chlorine atom content difference C) obtained from the chlorine atom content A and the chlorine atom content B by following formula (4) is preferably 0.5% by weight or less.

$$\text{Chlorine atom content difference } C = \text{Chlorine atom content } A - \text{Chlorine atom content } B \tag{4}$$

The chlorine atom content difference C obtained by the formula (4) enables the estimation of the amount of chlorine atoms not bonded to the resin. This enables the estimation of the amount of chloride ions such as NaCl, for example. The chlorine atom content difference C of not greater than the upper limit allows the modified polyvinyl acetal resin to improve battery durability when used for an electrode of a storage battery. The value (chlorine atom content difference C) obtained by the formula (4) is more preferably and 0.1% by weight or less. The preferred lower limit is not limited and may be 0.001% by weight or more.

Examples of the method for producing the modified polyvinyl acetal resin of the present invention include: a method that includes providing a polyvinyl alcohol including a chlorine atom-containing structural unit and then acetalizing the polyvinyl alcohol; and a method that includes acetalizing a polyvinyl alcohol not including a chlorine atom-containing structural unit and then adding a chlorine atom. Other examples include a method that includes providing a polyvinyl alcohol including a chlorine atom-containing structural unit and a polyvinyl alcohol not including a chlorine atom-containing structural unit and then introducing a chlorine atom-containing structural unit by acetalization.

More specific examples include: a method that includes providing a polyvinyl alcohol already including a structural unit represented by the formula (2) and then acetalizing the polyvinyl alcohol; and a method that includes acetalizing a polyvinyl alcohol not including a structural unit represented by the formula (2) and then adding the portions corresponding to $R^4$ and $R^5$ of the structural unit represented by the formula (2). Other examples include a method that includes providing a polyvinyl alcohol already including a structural unit represented by the formula (2) and a polyvinyl alcohol not including a structural unit represented by the formula (2) and then introducing a structural unit represented by the formula (1) by acetalization.

Examples of the method for producing the polyvinyl alcohol including a chlorine atom-containing structural unit include a method that includes copolymerizing vinyl chloride and vinyl acetate and then adding an acid or alkali to a solution of the obtained copolymer in alcohol for saponification. Alternatively, the polyvinyl alcohol including a chlorine atom-containing structural unit may be produced by a method including adding a chlorine atom.

Examples of the method including adding a chlorine atom include a method that includes reacting a polyvinyl alcohol with chlorine gas.

The polyvinyl alcohol not including a chlorine atom-containing structural unit (hereinafter also referred to simply as a polyvinyl alcohol) can be obtained by saponifying a copolymer of vinyl ester and ethylene, for example. Examples of the vinyl ester include vinyl formate, vinyl acetate, vinyl propionate, and vinyl pivalate. In particular, vinyl acetate is suitable from the economic viewpoint.

The introducing a chlorine atom-containing structural unit by acetalization may be performed using a method that includes reacting a polyvinyl alcohol with a chlorine atom-containing aldehyde or aldehyde equivalent. Here, chlorine atom-containing aldehydes such as chloroacetaldehyde are highly reactive and difficult to uniformly react with a polyvinyl alcohol. They also tend to be highly hazardous. In an actual production process, therefore, an aldehyde equivalent is more preferably used.

Examples of the chlorine atom-containing aldehyde include chloroacetaldehyde, dichloroacetaldehyde, trichloroacetaldehyde, 3-chloropropionaldehyde, and 4-chlorobutyraldehyde.

The aldehyde equivalent is an aldehyde with a protective group or a compound that can be converted into an aldehyde by a conventional method. Examples thereof include acetal, hemiacetal, and aldehyde hydrate. Preferred among these are chlorine atom-containing aldehyde equivalents.

Examples of the chlorine atom-containing aldehyde equivalents include chloroacetaldehyde dimethyl acetal, chloroacetaldehyde diethyl acetal, 2-chloromethyl-1,3-dioxolane, dichloroacetaldehyde dimethyl acetal, dichloroacetaldehyde diethyl acetal, 2,2-dichloromethyl-1,3-dioxolane, trichloroacetaldehyde dimethyl acetal, trichloroacetaldehyde diethyl acetal, trichloroacetaldehyde methyl hemiacetal, trichloroacetaldehyde ethyl hemiacetal, chloral hydrate, 2,2,2-trichloromethyl-1,3-dioxolane, 3-chloropropionaldehyde dimethyl acetal, 3-chloropropionaldehyde diethyl acetal, 2-(2-chloroethyl)-1,3-dioxolane, 4-chlorobutyraldehyde dimethyl acetal, 4-chlorobutyraldehyde diethyl acetal, and 2-(3-chloropropyl)-1,3-dioxolane.

In the modified polyvinyl acetal resin of the present invention, an ethylenically unsaturated monomer may be copolymerized as long as the effects of the present invention are not impaired. Any ethylenically unsaturated monomer may be used. Examples thereof include acrylic acid, methacrylic acid, phthalic acid (anhydride), maleic acid (anhydride), and itaconic acid (anhydride). Other examples include acrylonitrile, methacrylonitrile, acrylamide, methacrylamide, trimethyl-(3-acrylamide-3-dimethylpropyl)-ammonium chloride, and acrylamide-2-methylpropanesulfonic acid and its sodium salt. Further examples include ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinyl sulfonate, and sodium allyl sulfonate. A terminal-modified polyvinyl alcohol may also be used which can be obtained by copolymerizing a vinyl ester monomer such as vinyl acetate and ethylene in the presence of a thiol compound such as thiolacetic acid or mercaptopropionic acid and saponifying the copolymer.

Examples of applications of the modified polyvinyl acetal resin of the present invention include: binders and dispersants for storage battery electrodes, pigments, and the like; modifiers for adhesives based on epoxy resins, phenolic resins, and the like; ceramic green sheets; and conductive pastes.

The modified polyvinyl acetal resin can also be used as a material of, for example, binders for ink products (e.g., gel inks), resins for 3D printers, actuators, gas separation membranes, adhesives, coating materials, and films.

In particular, the modified polyvinyl acetal resin of the present invention used as a binder for a storage battery electrode can reduce electrode resistance and prevent degradation caused by an electrolyte solution, making it possible to produce a high-power storage battery.

The modified polyvinyl acetal resin of the present invention used as a pigment dispersant can provide excellent dispersing properties for a halogen-substituted pigment such as halogenated copper phthalocyanine green (e.g., Pigment Green 7, Pigment Green 36) and excellent stability over time after the pigment has dispersed.

A composition for a storage battery electrode containing the modified polyvinyl acetal resin of the present invention, an organic solvent, and an active material is also one aspect of the present invention.

Such a composition for a storage battery electrode can have excellent dispersing properties for an active material and adhesion, reduce electric resistance, and prevent degradation caused by an electrolyte solution, making it possible to produce a high-power storage battery.

A composition for a storage battery electrode containing the modified polyvinyl acetal resin of the present invention, a polyvinylidene fluoride resin, an organic solvent, and an active material is also one aspect of the present invention.

The composition for a storage battery electrode containing both the modified polyvinyl acetal resin of the present invention and the polyvinylidene fluoride resin may allow for better adhesion and lower electric resistance than those containing the modified polyvinyl acetal resin of the present invention or the polyvinylidene fluoride resin alone.

In the composition for a storage battery electrode of the present invention, the amount of the chlorine atom-containing structural unit in the modified polyvinyl acetal resin of the present invention is preferably 0.5 mol % or more, more preferably 1 mol % or more from the viewpoint of compatibility.

The polyvinylidene fluoride resin preferably has a weight average molecular weight of 400,000 or greater and 1,200,000 or less, more preferably 600,000 or greater and 1,000,000 or less. The weight average molecular weight can be measured using an absolute molecular weight measurement method by gel permeation chromatography (GPC).

The weight ratio between the modified polyvinyl acetal resin of the present invention and the polyvinylidene fluoride resin is preferably 0.5:9.5 to 8:2, more preferably 1:9 to 7:3. The weight ratio within the range can result in improved adhesion and even lower electrode resistance. The resin content (the sum of the weight of the modified polyvinyl acetal resin of the present invention and the weight of the polyvinylidene fluoride resin) of the composition for a storage battery electrode of the present invention is preferably 0.5 to 4 parts by weight, more preferably 0.6 to 3 parts by weight, still more preferably 0.7 to 2 parts by weight. The resin content of 0.5 parts by weight or greater allows the composition to exhibit high adhesion. The resin content of 4 parts by weight or less makes it possible to produce an electrode having low electric resistance.

A pigment composition containing the modified polyvinyl acetal resin of the present invention, an organic solvent, and a pigment is also one aspect of the present invention.

Such a pigment composition can achieve excellent pigment dispersibility and high stability over time.

Examples of the active material include a positive electrode active material and a negative electrode active material.

Examples of the positive electrode active material include lithium-containing complex metal oxides such as lithium nickel oxide, lithium cobalt oxide, and lithium manganese oxide. Specific examples thereof include $LiNiO_2$, $LiCoO_2$, and $LiMn_2O_4$.

The negative electrode active material may be a material that has been conventionally used as a negative electrode active material for storage batteries, such as spherical natural graphite, natural graphite, artificial graphite, amorphous carbon, carbon black, and a material obtained by adding a different element to any of these components.

These may be used alone or in combination of two or more.

The composition for a storage battery electrode of the present invention preferably further contains a conductive additive (conductivity-imparting agent). When the conductive additive is contained, the resulting composition for a storage battery electrode can have further lower electric resistance. Examples of the conductive additive include carbon materials such as graphite, acetylene black, carbon black, ketjen black, and vapor-grown carbon fiber.

Examples of the pigment include phthalocyanine, isoindolinone, quinophthalone, isoindoline, anthraquinone, diketopyrrolopyrrole, perylene, perynone, quinacridone, and dioxazine pigments.

Examples of the phthalocyanine pigments include metal phthalocyanine pigments and metal-free phthalocyanine pigments. Examples of the metal phthalocyanine pigments include halogenated copper phthalocyanine pigments, halogenated zinc phthalocyanine pigments, and aluminum phthalocyanine pigments.

Preferred among the halogenated copper phthalocyanine pigments are Pigment Green 7 and Pigment Green 36.

Examples of the organic solvent include alcohols, polyalcohols, glycol ethers, esters, amide solvents, and amine solvents.

Examples of the alcohols include ethanol, n-propanol, isopropanol, n-butanol, isobutanol, tert-butyl alcohol, pentanol, hexanol, n-heptanol, 2-heptanol, octanol, 2-ethylhexanol, 3,5,5-trimethylhexanol, nonanol, decanol, other higher alcohols (e.g., cyclohexanol), benzyl alcohol, terpineol, and dihydroterpineol.

Examples of the polyalcohols include ethylene glycol, diethylene glycol, triethylene glycol, and phenyl glycol.

Examples of the glycol ethers include propylene glycol monomethyl ether, propylene glycol monobutyl ether, methyl cellosolve, ethyl cellosolve, butyl cellosolve, butyl carbitol, butyl triglycol, and methyl diglycol.

Examples of the esters include methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate.

Other esters that can be used include butyl cellosolve acetate, butyl carbitol acetate, terpineol acetate, and dihydroterpineol acetate.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

A mixture of two or more of the organic solvents may be used.

The composition for a storage battery electrode and the pigment composition of the present invention may contain additives such as a flame retardant auxiliary, a thickener, a defoamer, a leveling agent, or an adhesion-imparting agent in addition to the above materials, if necessary.

As a different embodiment, a modified polyvinyl alcohol resin including a chlorine atom-containing structural unit may be used.

The chlorine atom-containing structural unit is the same as that for the modified polyvinyl acetal resin of the present invention. The chlorine atom-containing structural unit is preferably a structure having a chlorine atom or a chlorine atom-containing group in a side chain, and is preferably a structural unit represented by the formula (2).

The modified polyvinyl alcohol resin as the different embodiment preferably has a ratio of the hydroxy group content to the amount of the chlorine atom-containing structural unit (hydroxy group content:amount of chlorine atom-containing structural unit) of 70:35 to 99.9:0.1.

In the different embodiment, the hydroxy group content is preferably 70 mol % or more and 99.9 mol % or less, and the amount of the chlorine atom-containing structural unit is preferably 0.1 mol % or more and 35 mol % or less, more preferably 30 mol % or less.

Advantageous Effects of Invention

The present invention can provide a modified polyvinyl acetal resin having excellent dispersing properties, adhesion, and stability over time and capable of reducing electrode resistance and preventing degradation caused by an electrolyte solution when used for an electrode of a storage battery, enabling the production of a high-power storage battery. The present invention also can provide a composition for a storage battery electrode and a pigment composition each containing the modified polyvinyl acetal resin.

DESCRIPTION OF EMBODIMENTS

The present invention is more specifically described in the following with reference to, but not limited to, examples.

Production Example 1

(Preparation of Chlorine-Modified Polyvinyl Acetal Resin)

An amount of 120 g of a polyvinyl alcohol (a) having a degree of saponification of 98.6 mol % and a degree of polymerization of 300 was added to 1,400 g of pure water and stirred at a temperature of 90 °C for about two hours for dissolution. This solution was cooled to 40 °C. To the solution were then added 100 g of hydrochloric acid having a concentration of 35% by weight, 50 g of n-butyraldehyde, and 28 g of chloroacetaldehyde dimethyl acetal. Acetalization reaction was performed with the solution temperature maintained at 50 °C to precipitate a reaction product. The liquid temperature was then maintained at 50 °C for six hours to complete the reaction, followed by neutralization, washing with water, and drying by conventional methods to give powder of a chlorine-modified polyvinyl acetal resin including a chlorine atom-containing structural unit. The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 2

Powder of a chlorine-modified polyvinyl acetal resin including a chlorine atom-containing structural unit was obtained as in Production Example 1 except that 45 g of n-butyraldehyde and 57 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 3

Powder of a chlorine-modified polyvinyl acetal resin including a chlorine atom-containing structural unit was obtained as in Production Example 1 except that 55 g of n-butyraldehyde and 30 g of chloral hydrate were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=Cl, $R^3$=Cl).

Production Example 4

Powder of a chlorine-modified polyvinyl acetal resin including a chlorine atom-containing structural unit was obtained as in Production Example 1 except that 57 g of n-butyraldehyde and 15 g of 3-chloropropionaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=$CH_2Cl$, $R^2$=H, $R^3$=H).

Production Example 5

Powder of a chlorine-modified polyvinyl acetal resin including a chlorine atom-containing structural unit was obtained as in Production Example 1 except that 58 g of n-butyraldehyde and 12 g of 4-chlorobutyraldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=$CH_2CH_2Cl$, $R^2$=H, $R^3$=H).

Production Example 6

Powder of a chlorine-modified polyvinyl acetal resin including a chlorine atom-containing structural unit was obtained as in Production Example 1 except that a polyvinyl alcohol (b) having a degree of saponification of 98.6 mol % and a degree of polymerization of 800 was used instead of the polyvinyl alcohol (a), and that 51 g of n-butyraldehyde and 33 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 7

Powder of a chlorine-modified polyvinyl acetal resin including a chlorine atom-containing structural unit was obtained as in Production Example 1 except that a polyvinyl alcohol (c) having a degree of saponification of 88.8 mol % and a degree of polymerization of 800 was used instead of the polyvinyl alcohol (a), and that 35 g of n-butyraldehyde and 25 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 8

Powder of a chlorine-modified polyvinyl acetal resin including a chlorine atom-containing structural unit was obtained as in Production Example 6 except that 44 g of n-butyraldehyde, 12 g of acetaldehyde, and 27 g of chloroacetaldehyde dimethyl acetal were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, the acetoacetal group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 9

(Synthesis of Modified Polyvinyl Alcohol (d))

A flask equipped with a stirrer, a thermometer, a dropping funnel, and a reflux condenser was charged with 1,000 parts by weight of vinyl acetate, 90 parts by weight of vinyl chloride, and 300 parts by weight of methanol. The system was purged with nitrogen and then the temperature was increased to 60 °C. To this system was added 1.1 parts by weight of 2,2-azobisisobutyronitrile to start polymerization. After five hours from the start of the polymerization, the polymerization was terminated. The solid concentration in the system when the polymerization was terminated was 53% by weight, and the polymerization yield relative to all the monomers was 65% by weight. After the unreacted monomers were removed under reduced pressure, a 45% by weight solution of the copolymer in methanol was obtained. The obtained copolymer was found to contain 92.4 mol % of a vinyl acetate unit and 7.6 mol % of a vinyl chloride unit by quantification of the unreacted monomers.

While 100 parts by weight of the solution of the copolymer in methanol was stirred at 40 °C, 25 parts by weight of a 3% NaOH solution in methanol was added and sufficiently mixed. The mixture was then left to stand. After 30 minutes, the solidified polymer was pulverized with a pulverizer, washed with methanol, and dried to give polymer powder (hereinafter referred to as a modified polyvinyl alcohol (d)).

The modified polyvinyl alcohol (d) had a degree of saponification of 98.5 mol %, an amount of a chlorine-modified side-chain-bond unit of 7.6 mol %, and a degree of polymerization of 800.

Powder of a chlorine-modified polyvinyl acetal resin including a chlorine atom-containing structural unit was obtained as in Production Example 1 except that the modified polyvinyl alcohol (d) was used instead of the polyvinyl alcohol (a), and that 53 g of n-butyraldehyde was added.

The obtained chlorine-modified polyvinyl acetal resin was dissolved in DMSO-$d_6$ (dimethyl sulfoxide) and subjected to $^1$H-NMR (nuclear magnetic resonance spectroscopy) to content, the butyral group content, and the amount of the chlorine-modified acetal-bond unit. Table 1 shows the results.

The chlorine atom-containing structural unit was a structural unit represented by the formula (2) ($R^4$=single bond, $R^5$=H).

Production Example 10

A solution of a chlorine-modified polyvinyl acetal resin including a chlorine atom-containing structural unit (resin content: 5% by weight) was obtained as in Production Example 1 except that a modified polyvinyl alcohol (e) including a chlorine atom-containing structural unit and having a degree of saponification of 98.5 mol %, an amount of a chlorine-modified side-chain-bond unit of 3.9 mol %, and a degree of polymerization of 800 was used instead of the polyvinyl alcohol (a), and that 64 g of n-butyraldehyde was added.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (2) ($R^4$=$CH_2$, $R^5$=H).

Production Example 11

Powder of a chlorine-modified polyvinyl acetal resin including a chlorine atom-containing structural unit was obtained as in Production Example 6 except that 5 g of n-butyraldehyde, 18 g of acetaldehyde, and 52 g of chloroacetaldehyde dimethyl acetal were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, the acetoacetal group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 12

Powder of a chlorine-modified polyvinyl acetal resin including a chlorine atom-containing structural unit was obtained as in Production Example 1 except that a polyvinyl alcohol (f) having a degree of saponification of 98.6 mol % and a degree of polymerization of 1,800 was used instead of the polyvinyl alcohol (a), and that 48 g of n-butyraldehyde and 26 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 13

Power of a chlorine-modified polyvinyl acetal resin including a chlorine atom-containing structural unit was obtained as in Production Example 1 except that a polyvinyl alcohol (g) having a degree of saponification of 99.5 mol % and a degree of polymerization of 1,800 was used instead of the polyvinyl alcohol (a), and that 24 g of n-butyraldehyde and 20 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^2$=Cl, $R^2$=H, $R^3$=H).

Production Example 14

Powder of a chlorine-modified polyvinyl acetal resin including chlorine atom-containing structural units was obtained as in Production Example 1 except that a modified polyvinyl alcohol (h) including a chlorine atom-containing structural unit and having a degree of saponification of 98.6 mol %, an amount of a chlorine-modified side-chain-bond unit of 5.4 mol %, and a degree of polymerization of 1,800 was used instead of the polyvinyl alcohol (a), and that 45 g of n-butyraldehyde and 14 g of chloroacetaldehyde dimethyl acetal were added instead of 50 g of n-butyraldehyde and 28 g of chloroacetaldehyde dimethyl acetal.

The obtained polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural units were a structural unit represented by the formula (1) ($R^1$=Cl, $R^2$=H, $R^3$=H) and a structural unit represented by the formula (2) ($R^4$=single bond, $R^5$=H).

Production Example 15

Powder of a chlorine-modified polyvinyl acetal resin including a chlorine atom-containing structural unit was obtained as in Production Example 12 except that 80 g of n-butyraldehyde and 5 g of chloroacetaldehyde dimethyl acetal were added instead of 48 g of n-butyraldehyde and 26 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 16

Powder of a chlorine-modified polyvinyl acetal resin including a chlorine atom-containing structural unit was obtained as in Production Example 1 except that a polyvinyl alcohol (i) having a degree of saponification of 98.2 mol % and a degree of polymerization of 2,700 was used instead of the polyvinyl alcohol (a), and that 47 g of n-butyraldehyde and 1 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 17

Powder of a chlorine-modified polyvinyl acetal resin including a chlorine atom-containing structural unit was obtained as in Production Example 1 except that a modified polyvinyl alcohol (j) including a chlorine atom-containing structural unit and having a degree of saponification of 98.3 mol %, an amount of a chlorine-modified side-chain-bond unit of 0.8 mol %, and a degree of polymerization of 2,700 was used instead of the polyvinyl alcohol (a), and that 62 g of n-butyraldehyde was added.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (2) ($R^4$=single bond, $R^5$=H).

Production Example 18

Power of a chlorine-modified polyvinyl acetal resin including a chlorine atom-containing structural unit was obtained as in Production Example 1 except that a polyvinyl alcohol (k) having a degree of saponification of 98.7 mol % and a degree of polymerization of 4,000 was used instead of the polyvinyl alcohol (a), and that 60 g of n-butyraldehyde and 6 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 19

Powder of a chlorine-modified polyvinyl acetal resin including a chlorine atom-containing structural unit was obtained as in Production Example 6 except that 61 g of n-butyraldehyde and 0.1 g of chloroacetaldehyde dimethyl acetal were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$ =H, $R^3$=H).

Production Example 20

Powder of a chlorine-modified polyvinyl acetal resin including a chlorine atom-containing structural unit was obtained as in Production Example 6 except that 31 g of n-butyraldehyde and 60 g of chloroacetaldehyde dimethyl acetal were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 21

Powder of a chlorine-modified polyvinyl acetal resin including a chlorine atom-containing structural unit was obtained as in Production Example 1 except that a modified polyvinyl alcohol (1) including a chlorine atom-containing structural unit and having a degree of saponification of 98.5 mol %, an amount of a chlorine-modified side-chain-bond unit of 0.06 mol %, and a degree of polymerization of 800 was used instead of the polyvinyl alcohol (a), and that 63 g of n-butyraldehyde was added.

The obtained chlorine-modified polyvinyl acetal resin was dissolved in DMSO-$d_6$ (dimethyl sulfoxide) and subjected to $^1$H-NMR (nuclear magnetic resonance spectroscopy) to content, the butyral group content, and the amount of the chlorine-modified acetal-bond unit. Table 1 shows the results.

The chlorine atom-containing structural unit was a structural unit represented by the formula (2) ($R^4$=single bond, $R^5$=H).

Production Example 22

Powder of a chlorine-modified polyvinyl acetal resin including a chlorine atom-containing structural unit was obtained as in Production Example 6 except that 53 g of n-butyraldehyde and 15 g of 4-chlorobenzaldehyde were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (3) ($R^6$=4-chlorophenyl).

Production Example 23

Powder of a chlorine-modified polyvinyl acetal resin including a chlorine atom-containing structural unit was obtained as in Production Example 6 except that 53 g of n-butyraldehyde and 10 g of 3-chlorobenzaldehyde were added instead of 51 g of n-butyraldehyde and 33 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (3) ($R^6$=3-chlorophenyl).

Production Example 24

Powder of a chlorine-modified polyvinyl acetal resin including a chlorine atom-containing structural unit was obtained as in Production Example 1 except that 30 g of n-butyraldehyde and 90 g of chloroacetaldehyde dimethyl acetal were added instead of 50 g of n-butyraldehyde and 28 g of chloroacetaldehyde dimethyl acetal.

The obtained chlorine-modified polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, the butyral group content, and the amount of the chlorine-modified acetal-bond unit. Table 1 shows the results.

The chlorine atom-containing structural unit was a structural unit represented by the formula (1) ($R^1$=Cl, $R^2$=H, $R^3$=H).

Production Example 25

A polyvinyl acetal resin powder was obtained as in Production Example 6 except that 66 g of n-butyraldehyde was added instead of 51 g of n-butyraldehyde and 33 g of chloroacetaldehyde dimethyl acetal.

The obtained polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, and the butyral group content. Table 1 shows the results.

Production Example 26

A polyvinyl acetal resin powder was obtained as in Production Example 12 except that 66 g of n-butyraldehyde was added instead of 48 g of n-butyraldehyde and 26 g of chloroacetaldehyde dimethyl acetal.

The obtained polyvinyl acetal resin was dissolved in DMSO-$d_6$ (dimethyl sulfoxide) and subjected to $^1$H-NMR (nuclear magnetic resonance spectroscopy) to measure the hydroxy group content, the acetyl group content, and the butyral group content. Table 1 shows the results.

Production Example 27

A polyvinyl acetal resin powder was obtained by adding NaCl to a commercially available polyvinyl acetal resin (hydroxy group content: 32.9 mol %, acetyl group content: 1.8 mol %, butyral group content: 65.3 mol %) to 5% by weight.

Example 1

(Preparation of Composition for Storage Battery Electrode)

To 20 parts by weight of a resin solution containing the chlorine-modified polyvinyl acetal resin of Production Example 1 (polyvinyl acetal resin: 3 parts by weight) were added 55 parts by weight of lithium cobalt oxide (produced by Nippon Chemical Industrial Co., Ltd., CELLSEED C-5H) as an active material, 5 parts by weight of acetylene black (produced by Denka Company Limited., DENKA BLACK) as a conductivity-imparting agent, and 25 parts by weight of N-methylpyrrolidone. They were then mixed using Thinky Mixer produced by Thinky Corporation to give a composition for a storage battery electrode.

Examples 2 to 24 and Comparative Examples 1 to 3

(Preparation of Composition for Storage Battery Electrode)

A composition for a storage battery electrode was obtained as in Example 1 except that a chlorine-modified polyvinyl acetal resin of a type and in an amount shown in Table 2 was used.

Example 25

(Preparation of Composition for Storage Battery Electrode)

An amount of 15 g of the chlorine-modified polyvinyl acetal resin obtained in Production Example 2 was dissolved in 85 g of N-methylpyrrolidone to give a polyvinyl acetal resin solution.

Separately, 5 g of a polyvinylidene fluoride resin (weight average molecular weight 600,000) was dissolved in 95 g of N-methylpyrrolidone to give a polyvinylidene fluoride resin solution.

To 10 parts by weight of the obtained polyvinyl acetal resin solution (polyvinyl acetal resin: 1.5 parts by weight) was added 30 parts by weight of the polyvinylidene fluoride resin solution (polyvinylidene fluoride resin: 1.5 parts by weight). Further, 55 parts by weight of lithium cobalt oxide (produced by Nippon Chemical Industrial Co., Ltd., CELLSEED C-5H) as an active material, 5 parts by weight of acetylene black (produced by Denka Company Limited., DENKA BLACK) as a conductivity-imparting agent, and 5 parts by weight of N-methylpyrrolidone were added. They were then mixed using Thinky Mixer produced by Thinky Corporation to give a composition for a storage battery electrode.

Example 26

A polyvinyl acetal resin solution and a polyvinylidene fluoride resin solution were prepared and a composition for a storage battery electrode was obtained as in Example 25 except that the chlorine-modified polyvinyl acetal resin obtained in Production Example 13 was used instead of the chlorine-modified polyvinyl acetal resin obtained in Production Example 2.

Example 27

A polyvinyl acetal resin solution and a polyvinylidene fluoride resin solution were prepared and a composition for a storage battery electrode was obtained as in Example 25 except that the chlorine-modified polyvinyl acetal resin obtained in Production Example 18 was used instead of the chlorine-modified polyvinyl acetal resin obtained in Production Example 2.

Example 28

A polyvinyl acetal resin solution and a polyvinylidene fluoride resin solution were prepared and a composition for a storage battery electrode was obtained as in Example 26 except that a polyvinylidene fluoride resin (weight average molecular weight 1,000,000) was used instead of the polyvinylidene fluoride resin (weight average molecular weight 600,000).

Example 29

A composition for a storage battery electrode was obtained as in Example 1 except that the chlorine-modified polyvinyl acetal resin obtained in Production Example 12 was used, and that 13.3 parts by weight of the polyvinyl acetal resin solution (polyvinyl acetal resin: 2 parts by weight) was added instead of 20 parts by weight of the polyvinyl acetal resin solution (polyvinyl acetal resin: 3 parts by weight) when the composition for a storage battery electrode was prepared.

Example 30

A composition for a storage battery electrode was obtained as in Example 1 except that the chlorine-modified polyvinyl acetal resin obtained in Production Example 12 was used, that 26.7 parts by weight of the polyvinyl acetal resin solution (polyvinyl acetal resin: 4 parts by weight) was added instead of 20 parts by weight of the polyvinyl acetal resin solution (polyvinyl acetal resin: 3 parts by weight) when the composition for a storage battery electrode was prepared, and that 10 parts by weight of N-methylpyrrolidone was added instead of 25 parts by weight of N-methylpyrrolidone.

Comparative Example 4

An amount of 10 g of a polyvinylidene fluoride resin (weight average molecular weight 600,000) was dissolved in 90 g of N-methylpyrrolidone to give a polyvinylidene fluoride resin solution.

To 30 parts by weight of the obtained polyvinylidene fluoride resin solution (polyvinylidene fluoride resin: 3 parts by weight) were added 55 parts by weight of lithium cobalt oxide (produced by Nippon Chemical Industrial Co., Ltd., CELLSEED C-5H) as an active material, 5 parts by weight of acetylene black (produced by Denka Company Limited., DENKA BLACK) as a conductivity-imparting agent, and 5 parts by weight of N-methylpyrrolidone. They were then mixed using Thinky Mixer produced by Thinky Corporation to give a composition for a storage battery electrode.

Examples 31 to 46 and Comparative Examples 5 to 7

(Preparation of Pigment Composition)

An amount of 2.25 g of one of the (modified) polyvinyl acetal resins obtained in Production Examples 1 to 11, 19 to 23, and 25 to 27 as shown in Table 3, 22.5 g of a pigment, and 147.75 g of an organic solvent were mixed and stirred using a stirring device for one hour to prepare a pigment dispersion.

The pigment used was Pigment Green 7 (produced by Resino Color Industry Co., Ltd., phthalocyanine green, average particle size 80 μm). The organic solvent used was benzyl alcohol.

<Evaluation>

The following evaluations were performed on the (modified) polyvinyl acetal resins obtained in the production examples and the compositions for a storage battery electrode and the pigment compositions obtained in the examples and the comparative examples. Tables 2 and 3 show the results.

(1) Measurement of Chlorine Atom Contents (Chlorine Atom Contents A and B) of Resin The obtained polyvinyl acetal resin was subjected to combustion ion chromatography to measure the chlorine atom content A in conformity with JIS K 0127(2013). The sample combustion device used was AQF-100 (produced by Mitsubishi Chemical Analytech Co., Ltd.). The ion chromatograph used was ICS-1500 (produced by Dionex Corporation), and the ion exchange column used was Dionex IonPac AS12A (produced by Thermo Fisher Scientific K.K.).

Separately, a chlorine atom content was calculated from the chlorine-modified unit content obtained by $^1$H-NMR, and used as the chlorine atom content B.

Further, from the chlorine atom content A and the chlorine atom content B, the chlorine atom content difference C was calculated using the following formula (4).

$$\text{Chlorine atom content difference } C = \text{Chlorine atom content } A - \text{Chlorine atom content } B \quad (4)$$

(2) Evaluation of Composition for Storage Battery Electrode (2-1) Adhesion (Peeling Force)

The obtained composition for a storage battery electrode was evaluated for the adhesion to aluminum foil.

The composition for an electrode was applied to aluminum foil (thickness: 20 μm) to a dried thickness of 20 μm, and dried to prepare a specimen having a sheet-like electrode formed on the aluminum foil.

The specimen was cut to a size of 1 cm in length and 2 cm in width. Using AUTOGRAPH ("AGS-J" produced by Shimadzu Corporation), the electrode sheet was pulled up with the specimen being fixed, and the peeling force (N) needed for completely peeling the electrode sheet from the aluminum foil was measured. The adhesion was then evaluated based on the following criteria.

○ (Good): A peeling force of 8.0 N or greater

Δ (Fair): A peeling force of less than 8.0 and greater than 6.0 N x (Poor): A peeling force of 6.0 N or less (2-2) Dispersing Properties (Surface Roughness)

The surface roughness Ra of the specimen obtained in "(2-1) Adhesion" was measured in conformity with JIS B 0601(1994). The electrode surface roughness was evaluated in accordance with the following criteria. Typically, the higher the dispersibility of the active material, the lower the surface roughness.

○ (Good): A Ra of less than 3.0 μm

Δ (Fair): A Ra of 3.0 μm or greater and less than 4.0 μm x (Poor): A Ra of 4.0 μm or greater (2-3) Resistance Against Electrolyte Solution (Solubility in Solvent)

(Preparation of Electrode Sheet)

The compositions for a storage battery electrode obtained in the examples and the comparative examples were each applied to a release-treated polyalkylene terephthalate (PET) film to a dried film thickness of 20 μm and dried to prepare an electrode sheet.

The electrode sheet was cut into a 2-cm square electrode sheet specimen.

(Elution Evaluation)

The obtained specimen was accurately weighed, and the weight of the resin contained in the specimen was calculated from the weight ratio between the components contained in the sheet. Then, the specimen was placed in a mesh bag, and the sum of the weight of the mesh bag and the weight of the specimen was accurately measured.

The mesh bag containing the specimen was immersed in a solvent mixture (diethyl carbonate:alkylene carbonate=1:1), which is a solvent of an electrolyte solution, and left to stand at 60 °C for five hours. After the standing, the mesh bag was taken out and dried under the conditions of 150 °C and eight hours to completely vaporize the solvent.

The mesh bag was taken out from the dryer, left to stand at room temperature for one hour, and weighed. The amount of the eluted resin was calculated based on the weight change before and after the test, and the resin elution rate was calculated based on the ratio between the amount of the eluted resin and the weight of the resin calculated in advance. The obtained elution rate was evaluated in accordance with the following criteria.

○ (Good): An elution rate of less than 1.0%

Δ (Fair): An elution rate of 1.0% or greater and less than 2.0% x (Poor): An elution rate of 2.0% or greater (2-4) Measurement of Electrode Resistance The electrode resistance of the specimen obtained in "(2-1) Adhesion" was measured using an electrode resistance meter (produced by Hioki E. E. Corp.) and evaluated in accordance with the following criteria.

○○ (Excellent): An electrode resistance of less than 400 Ω/sq

○ (Good): An electrode resistance of 400 Ω/sq or greater and less than 700 Ω/sq

Δ (Fair): An electrode resistance of 700 Ω/sq or greater and less than 1,000 Ω/sq x (Poor): An electrode resistance of 1,000 Ω/sq or greater (3) Evaluation of Battery Performance (Preparation of Coin Cell)

The compositions for a storage battery electrode obtained in Examples 2, 3, 9, 11 to 13, 16, 18, 22, and 25 to 30 and Comparative Examples 1 to 4 were each applied to aluminum foil (thickness 20 μm) and dried to give a positive electrode sheet having a dried thickness of 80 μm. A piece (φ11 mm) was punched out from this positive electrode sheet to give a positive electrode layer. Separately, a piece (φ11 mm) was punched out from a metal lithium foil having a thickness of 100 μm to give a negative electrode layer. A solvent mixture (EC:DEC:EMC=3:4:3) containing 1 mol/L of $LiPF_6$ was used an electrolyte solution. A positive electrode collector, the positive electrode layer, a porous PP membrane separator (thickness 25 μm), the negative electrode layer, and a negative electrode current collector were sequentially stacked. They are compressed using a crimper to prepare a sealed coin cell.

(Charge/Discharge Cycle Evaluation)

The obtained coin cell was subjected to a charge/discharge cycle evaluation using a charge/discharge test device (produced by Hokuto Denko Corp.) in a voltage range from 3.0 to 4.2 V at a temperature of 25 °C. The ratio of capacity at the 300th cycle relative to the discharge capacity at the first cycle was calculated as the capacity retention (%).

The coin cell of Comparative Example 3 contained large amounts of Na ions and Cl ions, which adversely affect the battery performance, and thus showed a great decrease in capacity before 10 cycles after the start of the evaluation. The coin cell of Comparative Example 3 was thus evaluated "Not measurable."

(4) Evaluation of Pigment Composition (4-1) Dispersing Properties

The obtained pigment composition was diluted 100-fold. The average particle size (D50) was measured using a particle size distribution analyzer (produced by Shimadzu Corporation, SALD-7100) and evaluated in accordance with the following criteria.

○○ (Excellent): An average particle size of less than 300 μm

○ (Good): An average particle size of 300 μm or greater and less than 350 μm

Δ (Fair): An average particle size of 350 μm or greater and less than 400 μm x (Poor): An average particle size of 400 μm or greater, or coagulation (4-2) Stability Over Time (Viscosity Increase Over Time)

The initial viscosity (Pa·s) of the obtained pigment composition was measured using a cone and plate viscometer Gemini (produced by Bohlin Instruments) at 25 °C and a shear rate of 20 $s^{-1}$.

The viscosity (Pa·s) of the obtained pigment composition 30 days after the measurement of the initial viscosity was measured in the same manner. The viscosity change rate (%) was determined and evaluated in accordance with the following criteria.

○ (Good): A viscosity change rate of less than 10%

Δ (Fair): A viscosity change rate of 10% or greater and less than 15% x (Poor): A viscosity change rate of 15% or greater

TABLE 1

| | PVA type used | Degree of polymerization | Chlorination-modified acetal-bond unit | | | | | Chlorination-modified side-chain-bond unit | | |
|---|---|---|---|---|---|---|---|---|---|---|
| | | | $R^1$ structure | $R^2$ structure | $R^3$ structure | $R^6$ structure | Content (mol %) | $R^4$ structure | $R^5$ structure | Content (mol %) |
| Production Example 1 | (a) | 300 | Cl | H | H | — | 12.4 | — | — | 0 |
| Production Example 2 | (a) | 300 | Cl | H | H | — | 26.2 | — | — | 0 |
| Production Example 3 | (a) | 300 | Cl | Cl | Cl | — | 4.1 | — | — | 0 |
| Production Example 4 | (a) | 300 | $CH_2Cl$ | H | H | — | 6.3 | — | — | 0 |
| Production Example 5 | (a) | 300 | $CH_2CH_2Cl$ | H | H | — | 4.5 | — | — | 0 |
| Production Example 6 | (b) | 800 | Cl | H | H | — | 17.8 | — | — | 0 |
| Production Example 7 | (c) | 800 | Cl | H | H | — | 14.1 | — | — | 0 |
| Production Example 8 | (b) | 800 | Cl | H | H | — | 14.7 | — | — | 0 |
| Production Example 9 | (d) | 800 | — | — | — | — | 0 | Single bond | H | 7.6 |
| Production Example 10 | (e) | 800 | — | — | — | — | 0 | $CH_2$ | H | 3.9 |
| Production Example 11 | (b) | 800 | Cl | H | H | — | 27.3 | — | — | 0 |
| Production Example 12 | (f) | 1800 | Cl | H | H | — | 14.7 | — | — | 0 |
| Production Example 13 | (g) | 1800 | Cl | H | H | — | 10.4 | — | — | 0 |
| Production Example 14 | (h) | 1800 | Cl | H | H | — | 7.2 | Single bond | H | 5.4 |
| Production Example 15 | (f) | 1800 | Cl | H | H | — | 2.4 | — | — | 0 |
| Production Example 16 | (i) | 2700 | Cl | H | H | — | 0.3 | — | — | 0 |
| Production Example 17 | (j) | 2700 | — | — | — | — | 0 | Single bond | H | 0.8 |
| Production Example 18 | (k) | 4000 | Cl | H | H | — | 5.2 | — | — | 0 |
| Production Example 19 | (b) | 800 | Cl | H | H | — | 0.05 | — | — | 0 |
| Production Example 20 | (b) | 800 | Cl | H | H | — | 32.8 | — | — | 0 |
| Production Example 21 | (l) | 800 | — | — | — | — | 0 | Single bond | H | 0.06 |
| Production Example 22 | (b) | 800 | — | — | — | 4-Chlorophenyl | 5.8 | — | — | 0 |
| Production Example 23 | (b) | 800 | — | — | — | 3-Chlorophenyl | 3.5 | — | — | 0 |
| Production Example 24 | (a) | 300 | Cl | H | H | — | 49.3 | — | — | 0 |
| Production Example 25 | (b) | 800 | — | — | — | | 0 | — | — | 0 |
| Production Example 26 | (f) | 1800 | — | — | — | | 0 | — | — | 0 |
| Production Example 27 | — | 800 | — | — | — | | 0 | — | — | 0 |

TABLE 1-continued

| | Chlorination-modified unit content (mol %) | Butyral group content (mol %) | Acetoacetal group content (mol %) | Degree of non-chlorination acetalization (mol %) | Degree of acetalization (mol %) | Acetyl group content (mol %) | Hydroxy group content (mol %) | Chlorine atom content A (% by weight) | Chlorine atom content B (% by weight) | Chlorine atom content difference C (% by weight) |
|---|---|---|---|---|---|---|---|---|---|---|
| Production Example 1 | 12.4 | 49.8 | 0 | 49.8 | 62.2 | 1.4 | 36.4 | 3.6 | 3.6 | 0.0 |
| Production Example 2 | 26.2 | 43.4 | 0 | 43.4 | 69.6 | 1.2 | 29.2 | 7.4 | 7.3 | 0.1 |
| Production Example 3 | 4.1 | 54.3 | 0 | 54.3 | 58.4 | 1.2 | 40.4 | 3.5 | 3.5 | 0.0 |
| Production Example 4 | 6.3 | 56.6 | 0 | 56.6 | 62.9 | 1.5 | 35.6 | 1.9 | 1.8 | 0.1 |
| Production Example 5 | 4.5 | 57.1 | 0 | 57.1 | 61.6 | 1.6 | 36.8 | 1.3 | 1.3 | 0.0 |
| Production Example 6 | 17.8 | 50.3 | 0 | 50.3 | 68.1 | 1.3 | 30.6 | 5.1 | 5.0 | 0.1 |
| Production Example 7 | 14. | 35.9 | 0 | 35.9 | 50.0 | 11.2 | 38.8 | 4.2 | 4.0 | 0.2 |
| Production Example 8 | 14.7 | 43.1 | 16.6 | 59.7 | 74.4 | 1.7 | 23.9 | 4.2 | 4.1 | 0.1 |
| Production Example 9 | 7.6 | 51.3 | 0 | 51.3 | 51.3 | 1.5 | 39.6 | 4.5 | 4.5 | 0.0 |
| Production Example 10 | 3.9 | 62.4 | 0 | 62.4 | 62.4 | 1.6 | 32.1 | 2.2 | 2.2 | 0.0 |
| Production Example 11 | 27.3 | 4.2 | 26.5 | 30.7 | 58.0 | 1.2 | 40.8 | 8.6 | 8.5 | 0.1 |
| Production Example 12 | 14.7 | 47.3 | 0 | 47.3 | 62.0 | 1.4 | 36.6 | 4.3 | 4.2 | 0.1 |
| Production Example 13 | 10.4 | 23.4 | 0 | 23.4 | 33.8 | 0.5 | 65.7 | 3.6 | 3.5 | 0.1 |
| Production Example 14 | 12.6 | 43.8 | 0 | 43.8 | 51.0 | 1.4 | 42.2 | 5.6 | 5.4 | 0.2 |
| Production Example 15 | 2.4 | 72.5 | 0 | 72.5 | 74.9 | 1.3 | 23.8 | 0.7 | 0.7 | 0.0 |
| Production Example 16 | 0.3 | 46.9 | 0 | 46.9 | 47.2 | 1.8 | 51.0 | 0.1 | 0.1 | 0.0 |
| Production Example 17 | 0.8 | 61.3 | 0 | 61.3 | 61.3 | 1.7 | 36.2 | 0.5 | 0.5 | 0.0 |
| Production Example 18 | 5.2 | 59.4 | 0 | 59.4 | 64.6 | 1.3 | 34.1 | 1.6 | 1.5 | 0.1 |
| Production Example 19 | 0.05 | 60.2 | 0 | 60.2 | 60.3 | 1.4 | 38.4 | 0.01 | 0.01 | 0.0 |
| Production Example 20 | 32.8 | 30. | 0 | 30.1 | 62.9 | 1.4 | 35.7 | 9.6 | 9.3 | 0.3 |
| Production Example 21 | 0.06 | 62.2 | 0 | 62.2 | 62.2 | 1.5 | 36.2 | 0.03 | 0.03 | 0.0 |
| Production Example 22 | 5.8 | 51.2 | 0 | 51.2 | 57.0 | 1.3 | 41.7 | 1.6 | 1.6 | 0.0 |
| Production Example 23 | 3.5 | 51.9 | 0 | 51.9 | 55.4 | 1.4 | 43.2 | 1.0 | 1.0 | 0.0 |
| Production Example 24 | 49.3 | 28.9 | 0 | 28.9 | 78.2 | 1.2 | 20.6 | 13.1 | 13.0 | 0.1 |
| Production Example 25 | 0 | 64.7 | 0 | 64.7 | 64.7 | 1.6 | 33.7 | 0 | 0 | 0.0 |
| Production Example 26 | 0 | 64.3 | 0 | 64.3 | 64.3 | 1.6 | 34.1 | 0 | 0 | 0.0 |
| Production Example 27 | 0 | 65.3 | 0 | 65.3 | 65.3 | 1.8 | 32.9 | 5.0 | 0 | 5.0 |

TABLE 2

| | Composition for storage battery electrode | | | | Evaluation of composition for storage battery electrode | | | | | | | | Evaluation of battery performance |
|---|---|---|---|---|---|---|---|---|---|---|---|---|---|
| | Polyvinyl acetal | | PVDF | | Adhesion | | Dispersing properties | | Resistance against electrolyte solution | | Electrode resistance | | Charge/discharge cycle |
| | Type | Addition amount (parts by weight) | Weight average molecular weight | Addition amount (parts by weight) | Peeling force (N) | Rating | Surface roughness Ra (µm) | Rating | Elution rate (%) | Rating | Resistivity (Ω/sq) | Rating | Capacity retention (%) |
| Example 1 | Production Example 1 | 3 | — | — | 7.3 | Δ | 1.6 | ○ | 0.8 | ○ | 392 | ○○ | — |
| Example 2 | Production Example 2 | 3 | — | — | 8.0 | ○ | 1.3 | ○ | 0.7 | ○ | 288 | ○○ | 92 |
| Example 3 | Production Example 3 | 3 | — | — | 7.4 | Δ | 1.9 | ○ | 0.7 | ○ | 454 | ○ | 90 |
| Example 4 | Production Example 4 | 3 | — | — | 6.9 | Δ | 1.7 | ○ | 0.8 | ○ | 573 | ○ | — |
| Example 5 | Production Example 5 | 3 | — | — | 6.8 | Δ | 1.6 | ○ | 0.9 | ○ | 601 | ○ | — |
| Example 6 | Production Example 6 | 3 | — | — | 8.9 | ○ | 1.7 | ○ | 0.8 | ○ | 349 | ○○ | — |
| Example 7 | Production Example 7 | 3 | — | — | 9.1 | ○ | 1.9 | ○ | 1.3 | Δ | 458 | ○ | — |
| Example 8 | Production Example 8 | 3 | — | — | 8.6 | ○ | 1.7 | ○ | 1.6 | Δ | 397 | ○○ | — |
| Example 9 | Production Example 9 | 3 | — | — | 8.6 | ○ | 2.0 | ○ | 0.7 | ○ | 544 | ○ | 91 |
| Example 10 | Production Example 10 | 3 | — | — | 8.5 | ○ | 2.1 | ○ | 1.1 | Δ | 667 | ○ | — |
| Example 11 | Production Example 11 | 3 | — | — | 9.0 | ○ | 1.5 | ○ | 0.7 | ○ | 248 | ○○ | 94 |

TABLE 2-continued

| | Composition for storage battery electrode | | | | Evaluation of composition for storage battery electrode | | | | | | | | Evaluation of battery performance |
|---|---|---|---|---|---|---|---|---|---|---|---|---|---|
| | Polyvinyl acetal | | PVDF | | Adhesion | | Dispersing properties | | Resistance against electrolyte solution | | Electrode resistance | | Charge/discharge cycle |
| | Type | Addition amount (parts by weight) | Weight average molecular weight | Addition amount (parts by weight) | Peeling force (N) | Rating | Surface roughness Ra (μm) | Rating | Elution rate (%) | Rating | Resistivity (Ω/sq) | Rating | Capacity retention (%) |
| Example 12 | Production Example 12 | 3 | — | — | 10.1 | ○ | 2.2 | ○ | 0.8 | ○ | 353 | ○○ | 93 |
| Example 13 | Production Example 13 | 3 | — | — | 11.3 | ○ | 2.3 | ○ | 0.5 | ○ | 409 | ○ | 96 |
| Example 14 | Production Example 14 | 3 | — | — | 10.8 | ○ | 2.2 | ○ | 0.9 | ○ | 346 | ○○ | — |
| Example 15 | Production Example 15 | 3 | — | — | 10.5 | ○ | 2.5 | ○ | 1.9 | Δ | 590 | ○ | — |
| Example 16 | Production Example 16 | 3 | — | — | 11.9 | ○ | 2.8 | ○ | 0.9 | ○ | 672 | ○ | 91 |
| Example 17 | Production Example 17 | 3 | — | — | 11.7 | ○ | 2.9 | ○ | 1.2 | Δ | 693 | ○ | — |
| Example 18 | Production Example 18 | 3 | — | — | 13.1 | ○ | 3.9 | Δ | 0.9 | ○ | 518 | ○ | 87 |
| Example 19 | Production Example 19 | 3 | — | — | 8.2 | ○ | 2.0 | ○ | 1.4 | Δ | 829 | Δ | — |
| Example 20 | Production Example 20 | 3 | — | — | 8.8 | ○ | 1.8 | ○ | 0.7 | ○ | 310 | ○○ | — |
| Example 21 | Production Example 21 | 3 | — | — | 8.1 | ○ | 2.2 | ○ | 1.4 | Δ | 857 | Δ | — |
| Example 22 | Production Example 22 | 3 | — | — | 9.2 | ○ | 1.6 | ○ | 0.9 | ○ | 483 | ○ | 94 |
| Example 23 | Production Example 23 | 3 | — | — | 9.5 | ○ | 1.5 | ○ | 0.7 | ○ | 549 | ○ | — |
| Example 24 | Production Example 24 | 3 | — | — | 6.1 | Δ | 1.7 | ○ | 0.6 | ○ | 455 | ○○ | — |
| Example 25 | Production Example 2 | 1.5 | 600000 | 1.5 | 11.4 | ○ | 1.4 | ○ | 0.5 | ○ | 277 | ○○ | 94 |
| Example 26 | Production Example 13 | 1.5 | 600000 | 1.5 | 14.8 | ○ | 2.5 | ○ | 0.4 | ○ | 281 | ○○ | 97 |
| Example 27 | Production Example 18 | 1.5 | 600000 | 1.5 | 15.3 | ○ | 3.9 | Δ | 0.6 | ○ | 483 | ○ | 90 |
| Example 28 | Production Example 2 | 1.5 | 1000000 | 1.5 | 16.6 | ○ | 2.7 | ○ | 0.3 | ○ | 240 | ○○ | 97 |
| Example 29 | Production Example 12 | 2 | — | — | 8.3 | ○ | 2.5 | ○ | 0.8 | ○ | 276 | ○○ | 93 |
| Example 30 | Production Example 12 | 4 | — | — | 14.5 | ○ | 2.0 | ○ | 0.9 | ○ | 491 | ○ | 94 |
| Comparative Example 1 | Production Example 25 | 3 | — | — | 7.8 | Δ | 2.5 | ○ | 2.3 | X | 1107 | X | 67 |
| Comparative Example 2 | Production Example 26 | 3 | — | — | 9.0 | ○ | 3.1 | Δ | 2.0 | X | 1035 | X | 71 |
| Comparative Example 3 | Production Example 27 | 3 | — | — | 5.5 | X | 3.2 | Δ | 2.2 | X | 1324 | X | Not measurable |
| Comparative Example 4 | — | — | 600000 | 3 | 5.7 | X | 4.8 | X | 0.2 | ○ | 451 | ○ | 94 |

TABLE 3

| | | Evaluation of pigment composition | | | |
|---|---|---|---|---|---|
| | | Dispersing properties | | Viscosity increase over time | |
| | Formulation Resin type | Average particle size (μm) | Rating | Viscosity change rate (%) | Rating |
| Example 31 | Production Example 1 | 259 | ○○ | 6.2 | ○ |
| Example 32 | Production Example 2 | 235 | ○○ | 5.1 | ○ |
| Example 33 | Production Example 3 | 312 | ○ | 8.8 | ○ |
| Example 34 | Production Example 4 | 288 | ○○ | 7.5 | ○ |
| Example 35 | Production Example 5 | 274 | ○○ | 9.5 | ○ |
| Example 36 | Production Example 6 | 332 | ○ | 6.4 | ○ |
| Example 37 | Production Example 7 | 339 | ○ | 8 | ○ |
| Example 38 | Production Example 8 | 335 | ○ | 7 | ○ |
| Example 39 | Production Example 9 | 346 | ○ | 9.3 | ○ |
| Example 40 | Production Example 10 | 366 | Δ | 10.3 | Δ |
| Example 41 | Production Example 11 | 331 | ○ | 5.9 | ○ |
| Example 42 | Production Example 19 | 390 | Δ | 13.7 | Δ |
| Example 43 | Production Example 20 | 320 | ○ | 5.7 | ○ |
| Example 44 | Production Example 21 | 394 | Δ | 14.1 | Δ |
| Example 45 | Production Example 22 | 260 | ○○ | 6.1 | ○ |
| Example 46 | Production Example 23 | 281 | ○○ | 6.9 | ○ |
| Comparative Example 5 | Production Example 25 | 420 | X | 16.2 | X |
| Comparative Example 6 | Production Example 26 | 632 | X | 14.1 | Δ |
| Comparative Example 7 | Production Example 27 | 464 | X | 19.3 | X |

INDUSTRIAL APPLICABILITY

The present invention can provide a modified polyvinyl acetal resin having excellent dispersing properties, adhesion, and stability over time and capable of preventing degradation caused by an electrolyte solution when used for an electrode of a storage battery, enabling the production of a high-power storage battery. The present invention also can provide a composition for a storage battery electrode and a pigment composition each containing the modified polyvinyl acetal resin.

The invention claimed is:

1. A modified polyvinyl acetal resin comprising a chlorine atom-containing structural unit and containing the chlorine atom-containing structural unit in an amount of 35 mol % or less.

2. The modified polyvinyl acetal resin according to claim 1, containing the chlorine atom-containing structural unit in an amount of 0.1 mol % or more.

3. The modified polyvinyl acetal resin according to claim 1, wherein the chlorine atom-containing structural unit is a structure having a chlorine atom bonded via an acetal bond.

4. The modified polyvinyl acetal resin according to claim 1, wherein the chlorine atom-containing structural unit has a structure represented by the following formula (3):

[Chem. 1]

(3)

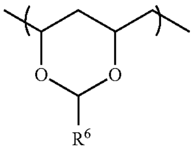

wherein $R^6$ represents a chlorine atom-containing hydrocarbon group.

5. The modified polyvinyl acetal resin according to claim 3, wherein the chlorine atom-containing structural unit has a structure represented by the following formula (1):

[Chem. 2]

(1)

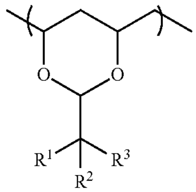

wherein $R^1$ represents a chlorine atom or a chloroalkyl group, and $R^2$ and $R^3$ each independently represent a hydrogen atom or a chlorine atom.

6. The modified polyvinyl acetal resin according to claim 5, wherein in the formula (1), $R^1$ is a chlorine atom, $-CH_2Cl$, or $-CH_2CH_2Cl$.

7. The modified polyvinyl acetal resin according to claim 4, wherein in the formula (3), $R^6$ is a chlorophenyl group or a chloroalkyl phenyl group.

8. The modified polyvinyl acetal resin according to claim 1, wherein the chlorine atom-containing structural unit has a structure represented by the following formula (2):

[Chem. 3]

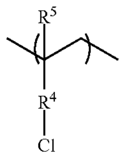

(2)

wherein $R^4$ represents a single bond or an alkylene group, and $R^5$ represents a hydrogen atom, a chlorine atom, or a chloroalkyl group.

9. The modified polyvinyl acetal resin according to claim 1, having a degree of polymerization of 200 to 4,000.

10. The modified polyvinyl acetal resin according to claim 1, having a hydroxy group content of 20 to 70 mol %.

11. The modified polyvinyl acetal resin according to claim 1, having a degree of non-chlorination acetalization of 20 to 75 mol %.

12. The modified polyvinyl acetal resin according to claim 1, having a chlorine atom content A measured by combustion ion chromatography of 0.1 to 15% by weight.

13. A composition for a storage battery electrode, the composition comprising:

the modified polyvinyl acetal resin according to claim 1;

an organic solvent; and an active material.

14. A pigment composition comprising:

the modified polyvinyl acetal resin according to claim 1;

an organic solvent; and a pigment.

15. A composition for a storage battery electrode, the composition comprising:

the modified polyvinyl acetal resin according to claim 1;

a polyvinylidene fluoride resin;

an organic solvent; and an active material.

* * * * *